United States Patent [19]

Winn et al.

[11] Patent Number: 5,328,275
[45] Date of Patent: Jul. 12, 1994

[54] UNITIZED WHEEL HUB AND BEARING ASSEMBLY

[75] Inventors: Laurence B. Winn, Longview; Mark N. Gold, Hallsville, both of Tex.

[73] Assignee: Stemco Inc., Longview, Tex.

[21] Appl. No.: 58,343

[22] Filed: May 6, 1993

[51] Int. Cl.⁵ ............................................. F16C 19/38
[52] U.S. Cl. .................................... 384/472; 384/559;
384/584; 384/589
[58] Field of Search ............... 384/472, 559, 510, 589,
384/584, 540

[56] References Cited

U.S. PATENT DOCUMENTS

| | | | |
|---|---|---|---|
| 3,156,506 | 11/1964 | Scheifele et al. | 384/589 |
| 4,037,849 | 7/1977 | Thumm | 277/37 |
| 4,552,367 | 11/1985 | Fedorovich et al. | 277/1 |
| 4,900,166 | 2/1990 | Candiard | 384/589 |
| 5,230,275 | 7/1993 | Hodge et al. | 384/559 |

OTHER PUBLICATIONS

SKF Sweden brochure entitled: "Truck Hub Unit" (Publication 3588E) (no date).
SAF brochure entitled: "The Fore Runner" (no date).
*Truck Technology International '92*-pp. 5, 227, 228, 230, 231, 235 and 236-Copyright 1992.

*Primary Examiner*—Lenard A. Footland
*Attorney, Agent, or Firm*—Howard S. Reiter; Richard W. Watson

[57] ABSTRACT

A unitized wheel hub and bearing assembly for use on the ends of stationary axles and particularly on tractor and trailer axles. A wheel hub, a pair of bearings and at least one seal are assembled with a mounting sleeve which is sized to be fitted on an axle end. The inclusion of a custom designed mounting sleeve permits the building of unitized assemblies to be used with existing axles as well as with new ones. The unitized construction allows pre-adjustment of the bearings and when two seals are employed, the bearings can also be pre-lubricated.

10 Claims, 2 Drawing Sheets

UNITIZED WHEEL HUB AND BEARING ASSEMBLY

FIELD OF THE INVENTION

This invention relates to a unitized wheel hub and bearing assembly for mounting on the ends of vehicle axles. More particularly, the assembly includes a special unitary mounting sleeve, a pair of bearings, at least one seal and a wheel hub. By means of the assembly the various elements may be pre-adjusted and, when two seals are used, may be pre-lubricated.

BACKGROUND OF THE INVENTION

In wheeled vehicles of all types, it is necessary to provide bearings for axles so that associated wheel hubs may rotate freely on the end of a relatively stationary axle. Such bearings must be lubricated and seals are required to retain the lubricating medium whether it be grease or oil. Frequently, wear sleeves are employed to prevent undue wear of the axle by the seals. Sometimes such wear sleeves have been separate elements and sometimes they have been an integral part of a unitized seal.

Until quite recently, such bearing, seal and wheel hub means have been assembled piece by piece. The bearing races have been fitted to designated axle portions and corresponding portions of the associated wheel hub. The bearing elements are usually spaced as far apart axially as possible with a tapered axle portion between the elements. The assembly also includes one or two seals, depending upon the particular design. These wheel hub assemblies have typically provided long lasting performance when assembled properly. However, such an assembly process requires skilled personnel and proper equipment to achieve proper installation and operation. If repair or replacement of any part becomes necessary, correct positioning and adjustment of all elements becomes even more of a challenge and damaged parts are a quite likely result. Typical prior art assemblies are illustrated in U.S. Pat. No. 4,552,367 assigned to Garlock Inc and U.S. Pat. No. 4,037,849 assigned to The Mechanex Corp.

More recently, some efforts have been made to develop assemblies which permit more of the various elements to be pre-assembled and adjusted, thus resulting in less dependance on the skills of the field mechanic. One such attempt has been the SAF Euro-axle developed by Otto Sauer Achsenfabrik of Keilberg, Germany. These units accomplish much in terms of allowing factory assembly and adjustment of sealed bearing units and avoidance of so much dependance on the skills of the field mechanic. However, these units are not constructed to allow prefilling with oil which is a preferred bearing lubricant as compared to grease. More significantly, a special axle is included in the assembly and the pre-assembled units cannot be adapted to the millions of existing axles presently in service.

Another recent effort at development of pre-assembled and pre-adjusted sealed bearing units has been made by SKF Sweden. However, as with SAF units described previously, the SKF units are not adapted to prefilling with oil lubrication and they are not adaptable to the millions of existing axles. Furthermore, since the bearing units are more closely located relative to one another, there can be a tendency toward lessened wheel stability in operation.

BRIEF DESCRIPTION OF THE DRAWINGS

A fuller understanding of the present invention will be gained by reference to the following detailed description when read in conjunction with the attached drawings in which.

SUMMARY OF THE INVENTION

The present invention overcomes these and other problems through the provision of a unitized wheel hub and bearing assembly which includes a special mounting sleeve or bore sleeve which can be designed to accommodate the complete assembly to any existing or new axle. The complete assembly preferably includes a pair of bearing elements with inner races mounted on the mounting sleeve and outer races mounted in a special wheel hub, axially inner and outer sealing means and suitable adjusting means. The mounting sleeve is made with an elongated portion preferably, but not necessarily, of uniform outside diameter to accommodate bearings of uniform size and, when appropriate, with a radially inwardly extending portion at its axially outer end to compensate for reduced diameter portions of the axle. The assembly may also include means for directing the flow of oil lubricant in order to improve heat transfer and reduce the likelihood of operating "hot spots".

It is thus a primary object of the invention to provide a unitized wheel hub and bearing assembly which can be factory assembled, adjusted and lubricated and which can be adapted to existing axles as well as new ones. It is a further object of the invention to provide such an assembly which offers the option of using either oil or grease as the bearing lubricant.

It is also an object to provide such a unitized assembly which may be installed on an axle end having cylindrical portions of differing diameters and separated by a tapered portion.

Yet another object is to provide such an assembly that permits wide axial spacing of the bearing element in order to promote wheel stability and to allow for the inclusion of means for directing lubricant flow.

DETAILED DESCRIPTION OF THE INVENTION

Figure 1:
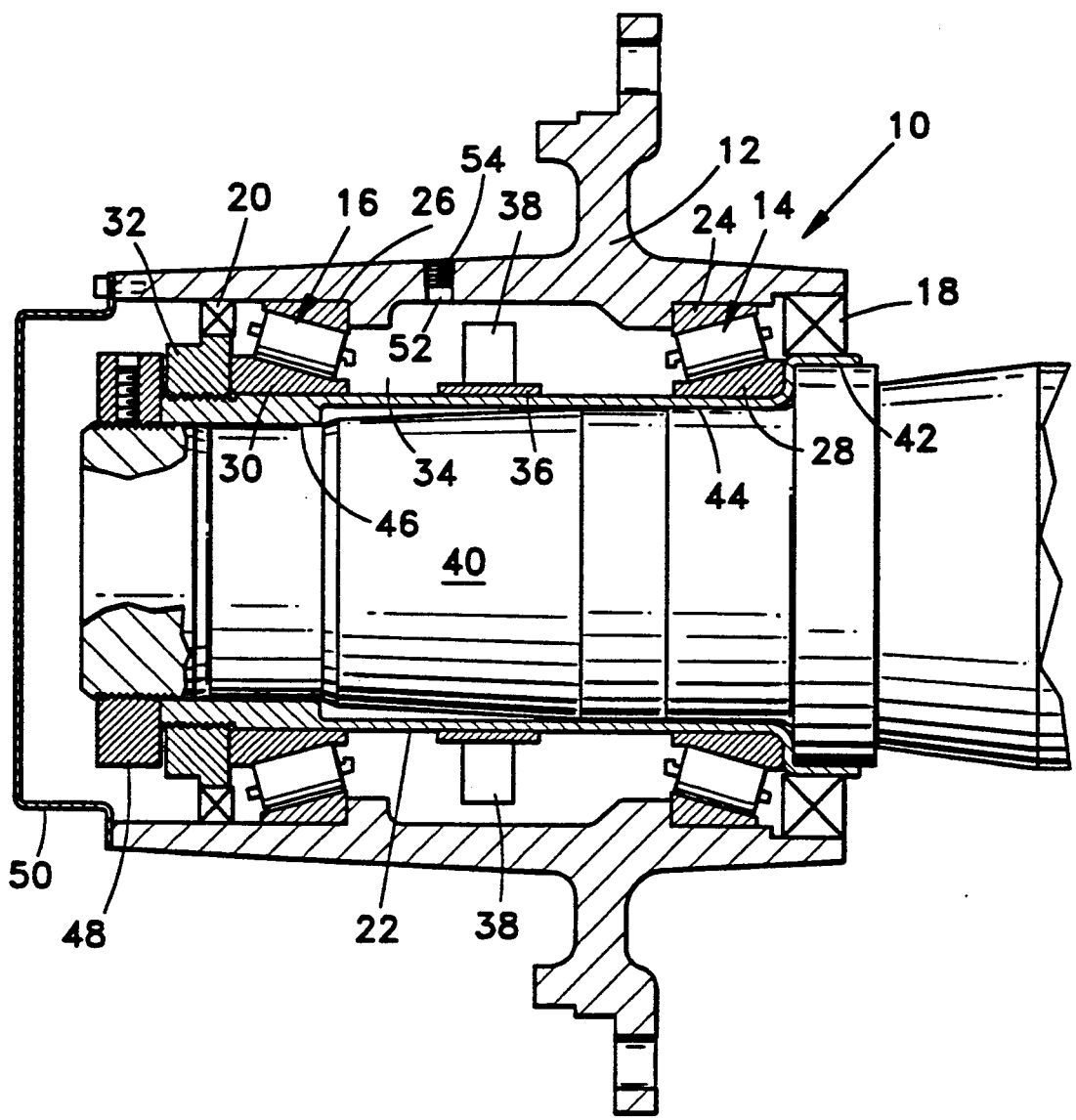
FIG. 1 is a cross-sectional view of a unitized wheel hub and bearing assembly according to the invention.

Referring now to the drawings, FIG. 1 shows a unitized wheel hub and bearing assembly 10 comprising primarily a wheel hub 12, axially inner and outer bearings 14 and 16, axially inner and outer seals 18 and 20 and a mounting sleeve 22. Radially outer bearing races 24 and 26 are pressed into bores within wheel hub 12 and radially inner bearing races 28 and 30 are fitted onto the primary radially outer cylindrical surface of mounting sleeve 22. Inner seal 18 is mounted between wheel hub 12 and mounting sleeve 22. A lock nut 32 is positioned on a threaded portion of mounting sleeve 22 and is used to adjust the bearings and assure that they maintain their proper position. Outer seal 20 is mounted between wheel hub 12 and an outer cylindrical surface of lock nut 32. Wheel hub 12, inner seal 18, mounting sleeve 22, lock nut 32 and outer seal 20 cooperate to form a sealed cavity 34 which contains bearings 14 and 16 and which is filled with bearing lubricant. The lubricant may be oil or grease, but in most instances, oil is preferred. The embodiment shown in FIG. 1 also includes an annular member 36 positioned on mounting sleeve 22 and holding a plurality of vanes 38. The vanes are preferably somewhat flexible to facilitate assembly and they serve to stir and direct flow of the lubricant, thus helping to insure that lubrication is maintained in the bearings at all times.

In practice, all of the members described thus far are assembled to form the unitized wheel hub and bearing assembly 10 ready for installation on an axle end as shown at 40. In order that assembly 10 may be solidly mounted on axle end 40, the mounting sleeve 22 is made with inner cylindrical surfaces dimensioned so as to locate upon portions of axle end 40. In the embodiment shown, those surfaces are at 42, 44 and 46. The entire assembly 10 is positioned on axle end 40 and held in axially proper position by spindle nut 48. Since bearing adjustment is accomplished by clamping and positively locking lock nut 32 at the time of assembly, no adjusting is required in the field to assure proper operation. Dust cap 50 is mounted on the end of wheel hub 12 to protect the axially outer portions of assembly 10 from road debris, dust, rain and any other potential contaminants.

Cavity 34 may be pre-filled with lubricant at any time prior to installation on axle end 40 or lubricant may be added through filler hole 52 which may be sealed with plug 54.

Figure 2:
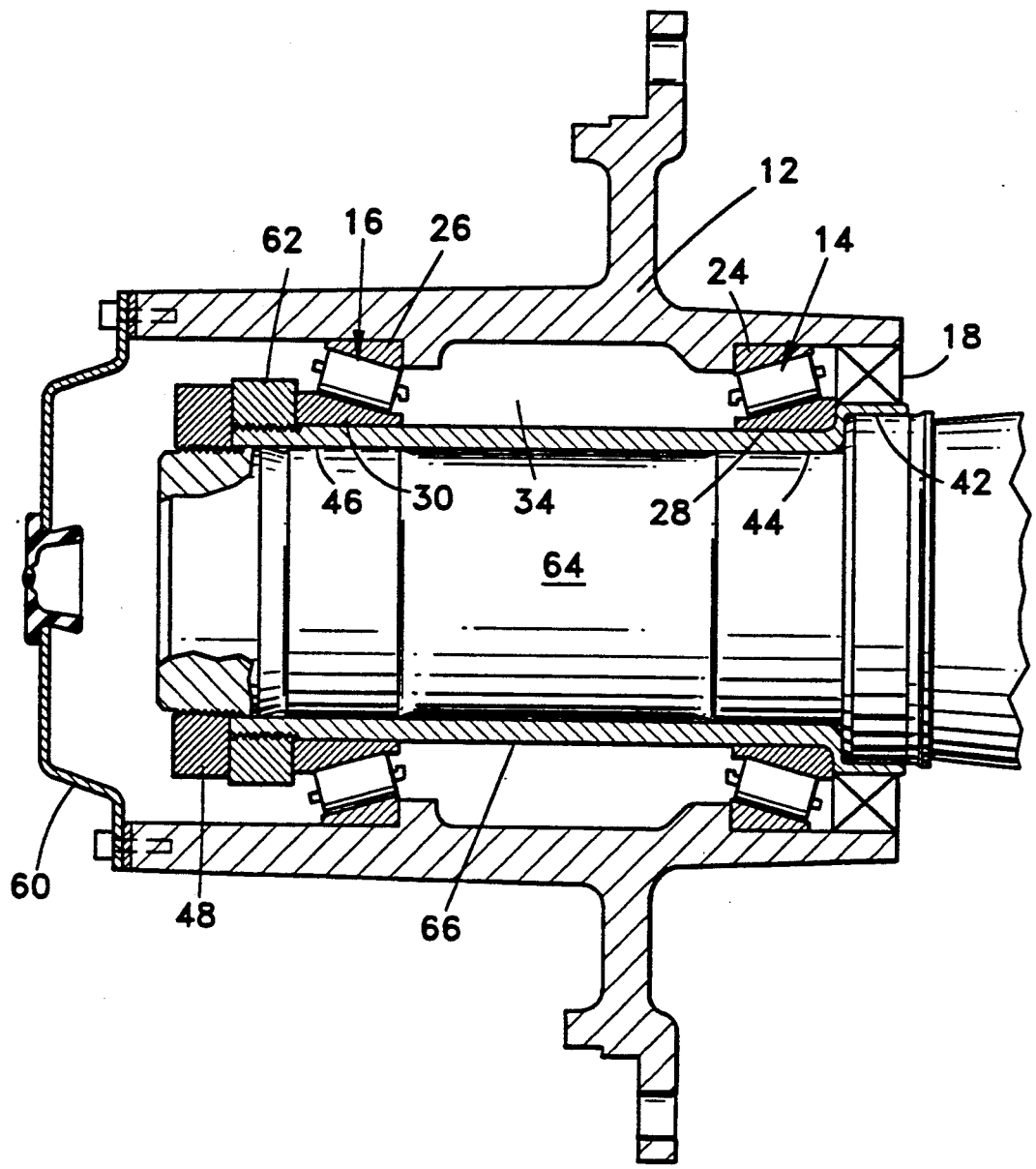
FIG. 2 is a cross-sectional view of a second unitized wheel hub and bearing assembly according to the invention.

FIG. 2 illustrates an alternative embodiment of the invention in which the axially outer seal 20 and the dust cap 50 of the embodiment of FIG. 1 are replaced by a standard vented hub cap 60. Also, since there is no axially outer seal, lock nut 62 is somewhat modified as compared to the lock nut 32 of FIG. 1. Also, axle end 64, instead of having a taper, is of substantially uniform diameter and thus, the diameter of mounting sleeve 66 is uniform over most of its length. In this embodiment, the advantages of having pre-adjusted bearings and having a single assembly to install are retained, but the user must select a proper lubricant and load it into the assembly. All other elements of FIG. 2 are substantially equivalent to the similarly numbered elements of FIG. 1 and their descriptions need not be repeated.

The seals of FIGS. 1 and 2 are shown schematically since a wide variety of seal designs may be used. In most instances, it will probably be preferred that the seals be of the lip type, that they include wear rings and that they be of unitized or semi-unitized design. However, other designs may be used. The essential requirement is that there be at least an axially inner seal. If a pre-lubricated assembly is desired, then there must also be an axially outer seal. Also, it is preferred that the bearings be well spread apart axially in order that overall vehicle stability may be enhanced. The mounting sleeve is of a material which has appropriate tensile properties for proper adjustment of the bearings. Most likely, a steel alloy will be preferred.

While preferred embodiments of the invention have been shown and described in detail, other modifications will be readily apparent to those skilled in the sealed wheel bearing art. For example, in the illustrated embodiments, the inner and outer bearings are shown to be of equal diameter and it is believed that such a design is generally to be preferred. However, there may be instances where bearings of different diameters are utilized, particularly on axles having a substantial taper. Thus, the preceding specification should be interpreted as exemplary rather than as limiting and the scope of the invention is defined by the following claims.

We claim:

1. A unitary wheel hub and sealed bearing assembly comprising:
    (a) a wheel hub,
    (b) a pair of bearings,
    (c) at least one seal, and
    (d) a unitary mounting sleeve,
    said bearing and seal elements securely held between said wheel hub and said mounting sleeve,
    said at least one seal being an axially inner seal and
    said assembly so configured as to be handled and installed on a vehicle axle as a unit and to be held in position by retaining means which engage an outer end of such a vehicle axle.

2. The unitary assembly of claim 1 further including an axially outer seal securely held between said wheel hub and said mounting sleeve.

3. The unitary assembly of claim 1 in which the bearings are of equal diameter.

4. The unitary assembly of claim 1 further including a plurality of vanes mounted on said mounting sleeve and positioned between said bearings.

5. The unitary assembly of claim 4 in which said vanes are flexible.

6. A unitary wheel hub and sealed bearing assembly for installation on an end of a vehicle axle, said assembly comprising:
    (a) a wheel hub
    (b) a pair of bearings,
    (c) at least one seal, and
    (d) a unitary mounting sleeve,
    said bearing and seal elements securely held between said wheel hub and said mounting sleeve,
    said at least one seal being an axially inner seal and
    said mounting sleeve having selectable inner and outer diameters at differing axial portions thereof to accommodate a variety of axle and bearing configurations and sizes.

7. The unitary assembly of claim 6 further including an axially outer seal securely held between said wheel hub and said mounting sleeve.

8. The unitary assembly of claim 6 in which said bearings are of equal diameter.

9. The unitary assembly of claim 6 further including a plurality of vanes mounted on said mounting sleeve and positioned between said bearings.

10. The unitary assembly of claim 9 in which said vanes are flexible.

* * * * *